C. A. BRISLAWN.
SNAP HOOK.
APPLICATION FILED NOV. 25, 1916.

1,240,662.

Patented Sept. 18, 1917.

Witness

Inventor
C. A. Brislawn,
By Victor J. Evans
Attorney

UNITED STATES PATENT OFFICE.

CLAUDE A. BRISLAWN, OF SPRAGUE, WASHINGTON.

SNAP-HOOK.

1,240,662.   Specification of Letters Patent.   Patented Sept. 18, 1917.

Application filed November 25, 1916.   Serial No. 133,439.

*To all whom it may concern:*

Be it known that I, CLAUDE A. BRISLAWN, a citizen of the United States, residing at Sprague, in the county of Lincoln and State of Washington, have invented new and useful Improvements in Snap-Hooks, of which the following is a specification.

This invention relates to improvements in snap hooks of that class in which a spring pressed bolt closes against the bill of the hook and is mounted for longitudinal movement in a tubular shank which has a slot in one side and in which the bolt is provided with a headed stud or button which operates in said slot, the object of the invention being to provide a snap hook of this class with guard flanges at opposite sides of the slot and between which the button operates and which guard flanges prevent the button from being casually engaged with any object when the snap hook is in use and hence prevents the button from being broken off and also prevents the bolt from casually detaching the hook.

The invention consists in the construction and arrangement of the guard flanges as hereinafter described and claimed.

Figure 1:
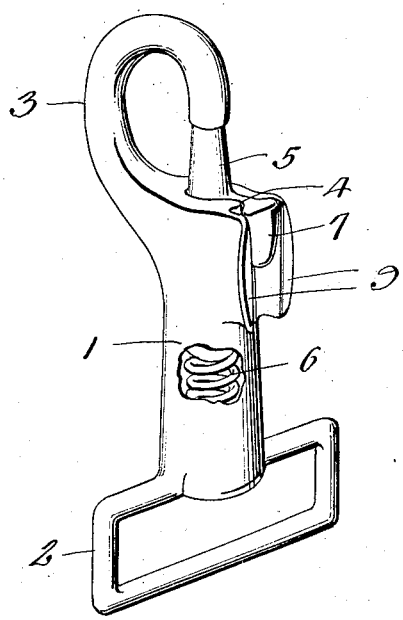
Figure 1 is a perspective view of a snap hook provided with guard flanges constructed and arranged in accordance with my invention.
Figure 2:
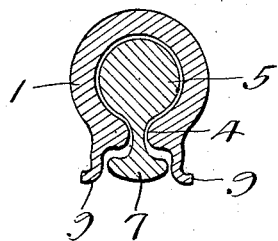
Fig. 2 is a transverse sectional view of the same.

The snap hook here shown is of the usual form providing a tubular shank 1 having an eye 2 at one end for the attachment of a strap and provided at the opposite end with a re-curved bill 3, the tubular shank having a slot 4 longitudinally thereof in the outer side, and a bolt 5 being provided which operates in the bore of the tubular shank, is closed against the point of the bill by means of a spring 6, and which bolt is provided with a headed stud or button 7 which operates in the slot.

A defect of such a snap hook is that when the same is in use the projecting button or headed stud is likely to come in contact with some object and be broken off or caused to retract the bolt and thereby casually disengage the snap hook and release the hook.

In accordance with my invention I provide the tubular shank of the snap hook with guard flanges 9 which are arranged at opposite sides of the slot, and are formed with the tubular shank and which are curved outwardly in opposite directions from the slot and are of such width as to effectually guard the headed stud or button and prevent the headed stud or button from being caught and broken off by contact with some object or from casually withdrawing the bolt and thereby releasing the hook. The outer edges of the guard flanges are in a common plane with the outer face of the headed stud or button so that the latter is effectually provided by said guard flanges under all conditions. The guard flanges, however, enable the headed stud or button to be readily manually operated when it is desired to open or release the hook.

Having thus described the invention what is claimed is:

A snap hook having a tubular shank provided with a slot, a bolt having a button arranged to operate in the slot and guard flanges extending outwardly from the shank, arranged at opposite sides of the slot and protecting the button from contact with objects, said guard flanges being curved transversely and being provided with curved outer edges.

In testimony whereof I affix my signature.

CLAUDE A. BRISLAWN.

Copies of this patent may be obtained for five cents each, by addressing the "Commissioner of Patents, Washington, D. C."